(12) United States Patent
Ferguson et al.

(10) Patent No.: US 9,092,680 B2
(45) Date of Patent: *Jul. 28, 2015

(54) ACTIVE LOGISTICAL TAG FOR CARGO

(71) Applicant: Lyngsoe Systems, LTD., Mississauga (CA)

(72) Inventors: Don Ferguson, Mississauga (CA); Mircea Paun, Mississauga (CA); Ioan Nicolescu, Mississauga (CA); Tudor Patroi, Mississauga (CA); Oleg Iagounov, Maple (CA)

(73) Assignee: Lyngsoe Systems, Ltd., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/078,924

(22) Filed: Nov. 13, 2013

(65) Prior Publication Data

US 2014/0062667 A1  Mar. 6, 2014

Related U.S. Application Data

(63) Continuation of application No. 12/067,385, filed on Jun. 23, 2009, now Pat. No. 8,587,430, which is a continuation of application No. PCT/CA2006/001544, filed on Sep. 20, 2006.

(60) Provisional application No. 60/718,334, filed on Sep. 20, 2005.

(51) Int. Cl.
*H04Q 5/22* (2006.01)
*G08B 13/14* (2006.01)
(Continued)

(52) U.S. Cl.
CPC ........ *G06K 7/10405* (2013.01); *G06K 19/0717* (2013.01); *G06K 19/0723* (2013.01); *G08B 13/2462* (2013.01); *G06K 2017/0045* (2013.01); *G06K 2017/0051* (2013.01)

(58) Field of Classification Search
CPC .......... G06K 19/0717; G06K 19/0723; G06K 2017/0045; G06K 7/10405; G06K 2017/0051; G06K 7/0008; G06K 7/10297; G08B 13/1436; G08B 13/1445; G08B 13/2462; G08B 21/0269; G08B 13/2442; G01S 13/751; G01S 5/10; G01S 5/0036; G01S 5/0252; H01L 29/6653; G01V 15/00
USPC ............... 340/825.54, 825.34, 825.49, 573.1, 340/573.4, 10.1, 568.7, 539.13, 568.1, 340/825.37, 572.1, 572.4, 10.51, 505, 547, 340/571, 539.11, 539.32, 10.3, 10.4, 572.8, 340/572.3; 700/115, 213, 225, 226; 342/357.1, 357.03, 357.07, 357.06, 27, 342/28, 59, 82–103, 165–175, 190–197, 342/29–51, 118, 450–465, 13, 129, 162; 455/456, 404, 517, 404.2, 456.1; 235/451, 383, 375, 492, 385
See application file for complete search history.

(56) References Cited

U.S. PATENT DOCUMENTS 4,727,360 A   2/1988  Ferguson et al.
5,844,482 A   12/1998 Guthrie et al.
(Continued)

OTHER PUBLICATIONS

European Search Report dated May 26, 2010 in corresponding European Application No. 06790712.1.

*Primary Examiner* — Mirza Alam
(74) *Attorney, Agent, or Firm* — Thomas | Horstemeyer, LLP

(57) ABSTRACT

An active logistical tag for cooperation with cargo elements, the tag comprising: a housing compatible for attachment of the cargo; a sensor suite for sensing logistical prompts, the prompts including at least one of motion, static magnetic fields and incident electromagnetic radiation; and a transmitter coupled to the sensor suite, for communicating logistical information in response to the logistical prompts.

22 Claims, 2 Drawing Sheets

(51) Int. Cl.

| | | |
|---|---|---|
| *G08B 1/08* | (2006.01) | |
| *G06F 19/00* | (2011.01) | |
| *G06K 7/10* | (2006.01) | |
| *G08B 13/24* | (2006.01) | |
| *G06K 19/07* | (2006.01) | |
| *G06K 17/00* | (2006.01) | |

(56) References Cited

U.S. PATENT DOCUMENTS

| | | |
|---|---|---|
| 6,107,971 A | 8/2000 | Flegeo |
| 6,236,565 B1 | 5/2001 | Gordon |
| 6,396,438 B1 * | 5/2002 | Seal .................. 342/127 |
| 6,422,595 B1 | 7/2002 | Breed et al. |
| 6,842,121 B1 | 1/2005 | Tuttle |
| 2003/0013146 A1 * | 1/2003 | Werb .................. 435/9 |
| 2003/0144985 A1 | 7/2003 | Ebert |
| 2003/0146835 A1 * | 8/2003 | Carter .................. 340/539.13 |
| 2004/0069850 A1 | 4/2004 | De Wilde |
| 2005/0017900 A1 * | 1/2005 | Grimm .................. 342/357.07 |
| 2005/0046584 A1 * | 3/2005 | Breed .................. 340/825.72 |
| 2005/0197077 A1 | 9/2005 | Bielmeier et al. |
| 2006/0006986 A1 * | 1/2006 | Gravelle et al. .......... 340/10.3 |
| 2006/0238347 A1 * | 10/2006 | Parkinson et al. ........ 340/572.4 |
| 2007/0268138 A1 | 11/2007 | Chung et al. |

* cited by examiner ved by a resident Global Position System receiver. A controller in the truck relays this information as well as any tag data collected by the reader to a host for presentation and analyses of the information.

ACTIVE LOGISTICAL TAG FOR CARGO

CROSS-REFERENCE TO RELATED APPLICATION

This application is a continuation of copending U.S. utility application entitled, "Active Logistical Tag for Cargo," having Ser. No. 12/067,385, filed Jun. 23, 2009, which is a national stage entry of and claims priority to PCT International Application No. PCT/CA2006/001544 entitled "Active Logistical Tag for Cargo," filed Sep. 20, 2006, which claims priority to U.S. provisional application, entitled "Active Logistical Tag for Cargo," having Ser. No. 60/718,334, filed on Sep. 20, 2005, all of which are entirely incorporated herein by reference in their entireties.

FIELD OF INVENTION

The present invention relates generally to a system that is used to collect logistical process information, permitting track and trace and statistical analyses, where Radio Frequency Transponders are used in conjunction with strategically or dynamically placed readers and antennas throughout a logistical process. In particular this invention relates to the ability to identify objects, but is not limited to the passage of objects through points of handover, specific location points or the location of objects with in a cellular space determined by the reception range of reading devices.

BACKGROUND OF THE INVENTION

The present invention relates to the design of a system solution including an active tag used to track Unit Loading Devices (ULD's) and ULD pallets during the storage and cargo handling process in aviation applications. The tag is designed with unique physical and operational characteristics that when combined permit: long extended battery life, identification of pallets and ULD's at portals, track and trace of pallets and ULD's in motion on dollies when used to transport cargo to aircraft. When the defined features are used in combination, identification and tracking of the pallets and ULD is achieved during storage, processing, travel to and from and placement within aircraft without the need to transmit continuously.

The objective of the stated invention is to permit automatic track and trace of Aluminum pallets and ULD's used to transport cargo in aircraft during processing and storage. Prerequisites to such an application demand a tag solution with unique and innovative features. These include: Mechanical protection of the tag without causing obstruction or altering the pallet profile and maintaining the structural integrity of the aluminum pallet; a mechanism for eliminating or control of transmission of the tag onboard the aircraft; identification of multiple pallets when stacked on one another; means of determining the direction of flow and open side of the ULD as they move down a conveyer system; identification of pallets as they pass specific points or points of handover; identification of pallets and ULD's when on the apron of the airfield being ready for loading or after being unloaded; and a 5 year operational life.

There are systems in place to collect the time and position of an object automatically. This equipment is typically installed throughout industrial and commercial facilities and permits automated collection or measurement of time of arrival data. Such equipment composed of antennas and readers are positioned at portals covering points of entry or in a cellular fashion.

Presently, corresponding tags are available in various formats including active tags with batteries, passive tags where the tags are powered by incident energy and semi-active tags where an integrated battery assists in the powering of the tag circuitry. Each of these solutions works well in specific environments. However the combined demands of cargo transport in the aviation environment, as enumerated above, requires a unique innovative solution.

It is known in the prior art for tag reader systems to rely on the frequency independence of the incident signal to the response signal. This is referred to in the industry as a dual frequency solution or dual independent stimulus solution. There is no relationship in time or mathematically between the incident wake up signal and response signal.

SUMMARY OF THE INVENTION

The present invention extends this concept to multiple independent means of wakeup to generate a response and manage power consumption. The wake up signal can be the result of a number of stimuli in addition to the Low Frequency disturbance field used as in the example presented in the patent. The wake up signal can be the result of multiple stimuli such as the detection of motion or the activation of a magnetic field sensitive reed switch. When these features are used in combination with innovative packaging techniques the resulting solution can be adjusted to meet the requirements of multiple applications.

The addition of a motion sensor is used to generate a response. Unlike previous systems, where a Low Frequency stimulus will also generate a response, it is also used to manage power consumption through embedded software controls. The low frequency (LF) frequency circuitry can be disabled when no motion is detected, thus extending the battery life of the apparatus. The delays between beacons when in beacon mode can also be extended when the tag is not in motion. This again will minimize power consumption.

The addition of a magnetic activated reed switch permits the simple activation of the apparatus—by placement of the tag close to a permanent magnet where by the tag will beacon its ID at randomized predefined intervals. With the application of the technology for tracking of aircraft pallets on shelves or on the dollies used to transport the pallets to an aircraft, permanent magnets can be mounted on the shelves or dollies causing the tags to beacon at predefined intervals. Where the pallets are made of aluminum and the tags are inserted in the aluminum channel, magnetic field penetration is still possible.

This innovative yet simple solutions permits the tag to beacon when on a shelf or on dollies and avoids transmission on the aircraft. It is also possible to activate the magnetic reed switch even if the pallets are staked one on top of each other.

Additional embedded software controls include the switching on and off of beacon features when exposed to Low Frequency fields with embedded address information. In order to extend battery life additional software controls can be switched on to extend the beacon interval over time or terminate after a period of time.

The present invention is compatible with the concept of a dynamic reader or cell network where readers are mounted on trucks and link to a host via a wireless network and where the position of the truck is determined by a resident Global Position System receiver. A controller in the truck relays this information as well as any tag data collected by the reader to a host for presentation and analyses of the information.

Other unique and innovative physical characteristics include the antenna design, which permits the tag to be imbedded in the C channel of the outer aluminum profile and yet be able to receive and radiate Electromagnetic energy used for communication also referred to Radio Frequency waves.

According to one aspect of the invention, there is provided an active logistical tag for cooperation with cargo elements, said tag comprising: a housing compatible for attachment of said tag to said cargo; a sensor suite for sensing logistical prompts, said prompts including at least two of motion, static magnetic fields and incident electromagnetic radiation; and a transmitter coupled to said sensor suite, for communicating logistical information in response to said logistical prompts.

BRIEF DESCRIPTION OF THE DRAWINGS

Embodiments will now be described more fully with reference to the accompanying drawings, in which.

DETAILED DESCRIPTION OF THE PREFERRED EMBODIMENT

Figure 1:
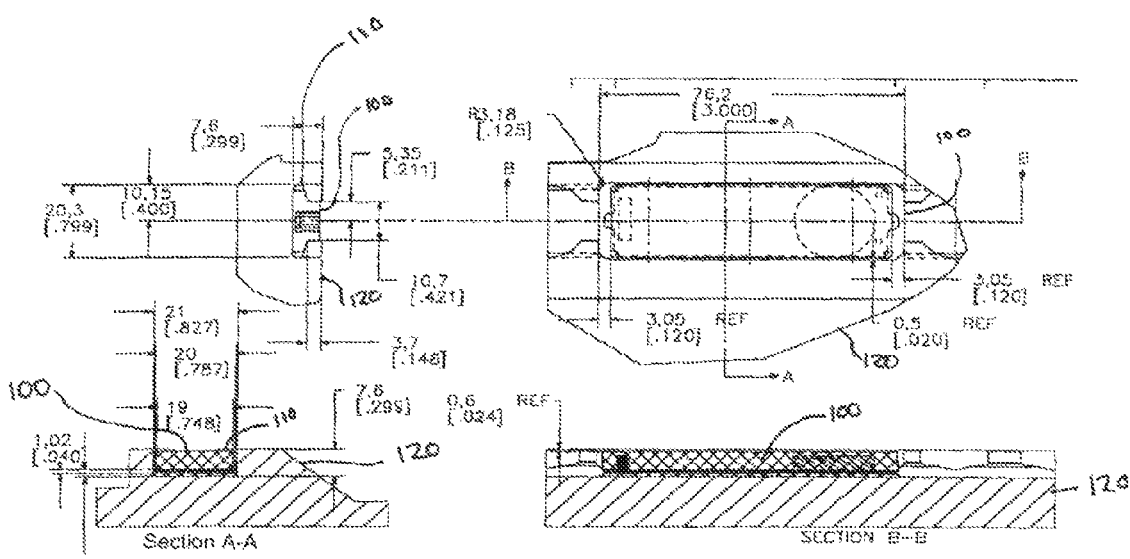
FIG. 1 is various views of a Unit Loading Device (ULD) tag and its placement in an outer rail of a pallet.

In the following description, an embodiment of a Unit Loading Device (ULD) tag for automatic track and trace of Unit Loading Devices and pallets is provided. Turning now to FIG. 1, there is shown the form factor of the Unit Loading Device (ULD) tag 100 and corresponding C slot 110 according to the invention.

Figure 2:
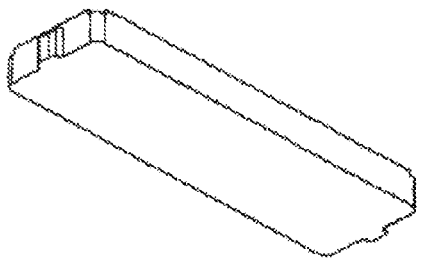
FIG. 2 is an orthogonal projection view of the ULD tag shown in FIG. 1, in isolation.

The ULD tag 100 is designed to fit into the C slot 110 of the outer rail 120 of a pallet or ULD. Note that a conventional outer rail 120 is slightly modified to permit the insertion of the tag into the slot. FIG. 1 shows the placement of the tag in the slot with the modifications described. The top part covering three position slots are removed or milled off to permit positioning of the ULD tag 100 in the C slot 110. The integrity of the outer rail 120 is not compromised as the channel remains intact. A 1.0 mm slot is milled on the leading edge of the preferably aluminum C slot 110 to permit electro magnetic leakage. The ULD tag 100 dimensions are such that the tag fits into the channel and is protected by the walls of the channel. The tag is potted in an epoxy resin for additional protection. A film with insulator properties may be preferably applied to the top side of the rail in the area of the ULD tag 100 to prevent electrical connection in that area when ULDs or pallets are stacked one on top of the other. FIG. 2 shows the ULD tag 100 in orthogonal projection.

Figure 3:
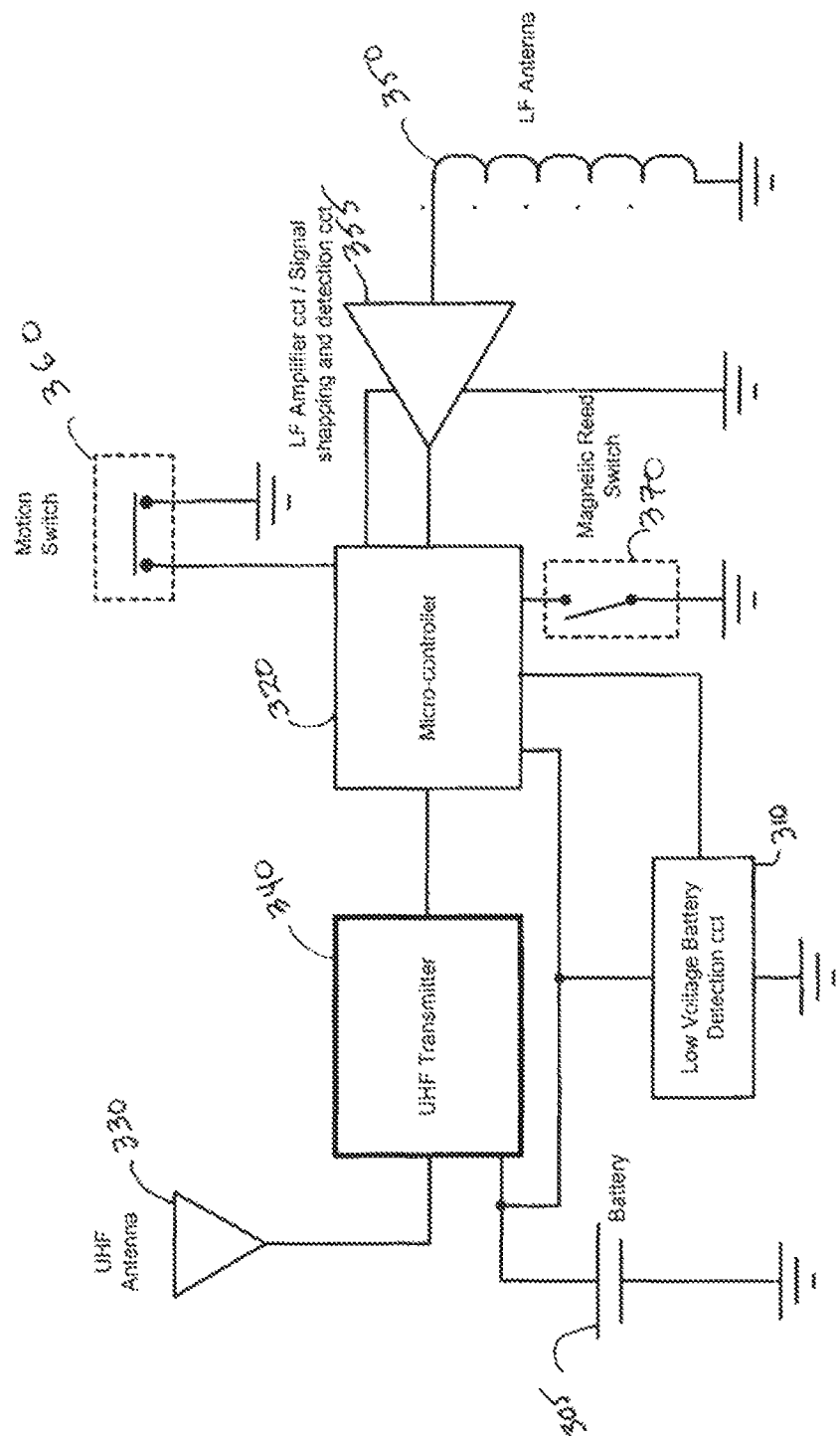
FIG. 3 is a schematic diagram of a ULD tag.

FIG. 3 is a schematic diagram of a ULD tag 100. The battery 305 is preferably a 3.0 V, 200 mA Hr Lithium ion button cell. During transmission the voltage of the battery may be qualified under load. This is facilitated by a low voltage detection circuit 310 connected to a low voltage low power micro-controller 320.

The UHF antenna 330 is specifically designed to permit the maximum power radiated when the ULD tag 100 is placed in the C slot 110. The antenna is composed of a wire mounted 3.2 mm off the printed circuit board. The UHF antenna 330 is deliberately placed perpendicular to the edge of the outer rail 120 when the ULD tag 100 is inserted in the C slot 110.

The UHF transmitter 340 is powered by the battery 305, driven by the micro-controller 320 and outputs signal to the UHF antenna 330. The UHF transmitter 340 can be constructed from discrete circuitry on integrated components. For the preferred embodiment the selected frequency of operation is 433.93 MHz where the selected modulation is FM and the deviation is 20 KHz.

The micro-controller 320 is preferably a low power, 8 bit device with internal clock features that permit intermittent or predefined wake up for regular polled transmission as well as interrupt enable inputs for event driven transmissions. The micro-controller 320 takes input from the sensor section which preferably includes an LF antenna 350 amplified by an amplifier 355, a motion switch 360 and a magnetic reed switch 370.

The LF antenna 350 and amplifier 355 are preferably designed to receive signals at 125 KHz as low as 2.0 mV. This amplifier section is designed to operate in standby mode in the absence of a signal with current consumption of less than 2 µA. The power to the amplifier 355 is preferably supplied under the control of the micro-controller 320. The power to the amplifier is preferably shut off when in the presence of the field or alternately may be powered only when motion is detected. This feature permits management of power and minimizes the consumption of power. The amplified signal is fed to a detection signal shaping circuit (not shown separately, but incorporated with amplifier 355) that is connected to the input of the micro-controller 320. Preferably that signal is connected to an interrupt driven port of the micro-controller 320, which gets serviced based on a transition. The signal presented to the port is decoded. Preferably, upon successful detection of a signal indicative of LF reception, the micro-controller 320 will active the UHF transmitter 340 and generate the signals required to transmit a unique ID and the ID of the LF transmitter that turned it on. In this case, the activating LF signal requires an embedded corresponding ID. The number of messages may vary and may preferably be user programmed. Preferably, random intermittent delays of message packet lengths are inserted between transmissions to avoid message collision.

The magnetic reed switch 370 is connected to another input of the micro-controller 320. That input is preferably an event (interrupt) driven port where, when a transition occurs, the micro wakes up and responds as programmed. If the magnetic reed switch 370 corresponding feature is enabled, the closing of the magnetic reed switch 370 results in the generation of beacon UHF transmissions at predefined intervals. Preferably, the interval between the beacon transmissions is software controllable and may be defined by the user.

The motion sensor switch 360 is connected to again another input of the micro-controller 320. The motion sensor switch 360 may include some conditioning circuit (not shown) to minimize false triggering. The addition of the motion sensor permits better power management. As mentioned above, with reference to the LF Antenna 350 and amplifier 355, as these components are powered by the micro-controller 320, it is possible to only provide power only when motion is detected. If the ULD tag 100 is at rest the amplifier 355 can be switched off. If the ULD tag is left in the presence of a low frequency field power consumption may also be kept to a minimum as, again, the amplifier 355 can be shut off. When motion is detected the ULD tag 100 may be programmed to beacon. In the case where the ULD tag 100 is already in beacon mode due the activation of the magnetic reed switch 370 the interval between beacons may be altered, preferably decreased. If no motion is sensed the interval between beacons can be altered, preferably increased. By better management of the beacon interval transmission clash and power consumption can be minimized.

Preferably, included with every transmission is a flag byte that defines the means of the transmission as to whether it is the result of motion, magnetic reed switch activation or LF field detection. In addition to the ID information and Flag byte the ULD tag 100 may preferably echo back the last exciter address seen with every transmission.

Tag readers for the ULD tag 100 that are mounted on trucks may be controlled by software running on resident computer on the truck. Such readers and software may include the capacity to connect to wireless networks, and to employ a connected global positioning receiver that provides latitude and longitude coordinates as to the position of the vehicle. These features may provide a dynamic infrastructure for reading tags.

Other software controllable features may preferably include the ability to enable or disable the beaconing feature by exposure to specific LF frequency fields with specific embedded addresses.

The above-described embodiment illustrates a tag for use in logistical track and trace compatible with aviation requirements. Although particular embodiments have been described, those of skill in the art will appreciate that variations and modifications may be made without departing from the spirit and scope thereof as defined by the appended claims.

What is claimed:

1. An active logistical tag for cooperation with a pallet, said tag comprising:
   a housing configured to fit within a slot in an outer rail of the pallet;
   a sensor section within the housing, the sensor section comprising:
   an electromagnetic radiation sensor comprising an amplifier and adapted to sense logistical prompts due to incident electromagnetic radiation;
   a motion sensor adapted to sense logistical prompts due to motion of the tag; and
   a static magnetic field sensor adapted to sense logistical prompts due to the tag being within a static magnetic field generated external to the pallet;
   a transmitter section within the housing the transmitter section adapted to transmit logistical information to a reader; and
   a controller within the housing, the controller in communication with the sensor section and the transmitter section, the controller configured to cause the transmitter section to transmit beacon signals in response to sensing, by the static magnetic field sensor, whether or not the tag is within external static magnetic field.

2. The active logistical tag of claim 1, wherein the controller is adapted to cause the transmitter section to transmit logistical information that varies according to which sensor sensed the logistical prompt.

3. The active logistical tag of claim 2, wherein the controller is adapted to cause the transmitter section to transmit logistical information that includes an indication of which sensor sensed a logistical prompt.

4. The active logistical tag of claim 1, wherein in event that the electromagnetic radiation sensor senses a logistical prompt and an identification of a particular exciting low frequency radiation transmitter is included as a signal in the sensed logistical prompt, the controller is adapted to cause the transmitter section to transmit logistical information that includes the identification of said particular exciting low frequency transmitter.

5. The active logistical tag of claim 1, wherein the controller is adapted to cause the transmitter section to transmit logistical information that includes an identification of said active logistical tag.

6. The active logistical tag of claim 1, wherein the transmitter section comprises an electromagnetic radiation transmitter.

7. The active logistical tag of claim 6, wherein the transmitter section is adapted to output electromagnetic radiation at a different fundamental frequency than the electromagnetic radiation sensor is adapted to sense.

8. The active logistical tag of claim 1, wherein the beacon signals are transmitted with random interval delays between successive beacon signals.

9. The active logistical tag of claim 1, wherein the sensor section comprises a false triggering condition circuit associated with the motion sensor.

10. The active logistical tag of claim 1, wherein the controller causes the transmitter section to transmit beacon signals in response to sensing, by the static magnetic field sensor, that the tag is within the external static magnetic field.

11. The active logistical tag of claim 1, wherein the controller causes the transmitter section to transmit beacon signals in response to sensing, by the static magnetic field sensor, that the tag is outside of the external static magnetic field.

12. An active logistical tag for cooperation with a pallet, said tag comprising:
    a housing configured to fit within a slot in an outer rail of the pallet;
    a sensor section within the housing, the sensor section comprising:
    an electromagnetic radiation sensor comprising an amplifier and adapted to sense logistical prompts due to incident electromagnetic radiation;
    a motion sensor adapted to sense logistical prompts due to motion of the tag; and
    a static magnetic field sensor adapted to sense logistical prompts due to the tag being within a static magnetic field generated external to the pallet;
    a transmitter section within the housing, the transmitter section adapted to transmit logistical information to a reader; and
    a controller within the housing, the controller in communication with the sensor section and the transmitter section, the controller configured to cause the transmitter section to transmit beacon signals in response to sensing, by the static magnetic field sensor, whether or not the tag is within external static magnetic field;
    wherein an interval between beacon signals transmitted by the transmitter section is determined according to whether the motion sensor senses a logistical prompt due to motion of the tag.

13. The active logistical tag of claim 12, wherein the controller is adapted to cause the transmitter section to transmit logistical information that varies according to which sensor sensed the logistical prompt.

14. The active logistical tag of claim 13, wherein the controller is adapted to cause the transmitter section to transmit logistical information that includes an indication of which sensor sensed a logistical prompt.

15. The active logistical tag of claim 12, wherein in event that the electromagnetic radiation sensor senses a logistical prompt and an identification of a particular exciting low frequency radiation transmitter is included as a signal in the sensed logistical prompt, the controller is adapted to cause the transmitter section to transmit logistical information that includes the identification of said particular exciting low frequency transmitter.

16. The active logistical tag of claim 12, wherein the controller is adapted to cause the transmitter section to transmit logistical information that includes an identification of said active logistical tag.

17. The active logistical tag of claim 12, wherein the transmitter section comprises an electromagnetic radiation transmitter.

18. The active logistical tag of claim 17, wherein the transmitter section is adapted to output electromagnetic radiation at a different fundamental frequency than the electromagnetic radiation sensor is adapted to sense.

19. The active logistical tag of claim 12, wherein the beacon signals are transmitted with random interval delays between successive beacon signals.

20. The active logistical tag of claim 12, wherein the sensor section comprises a false triggering condition circuit associated with the motion sensor.

21. The active logistical tag of claim 12, wherein the controller causes the transmitter section to transmit beacon signals in response to sensing, by the static magnetic field sensor, that the tag is within the external static magnetic field.

22. The active logistical tag of claim 12, wherein the controller causes the transmitter section to transmit beacon signals in response to sensing, by the static magnetic field sensor, that the tag is outside of the external static magnetic field.

* * * * *